United States Patent Office 3,373,145
Patented Mar. 12, 1968

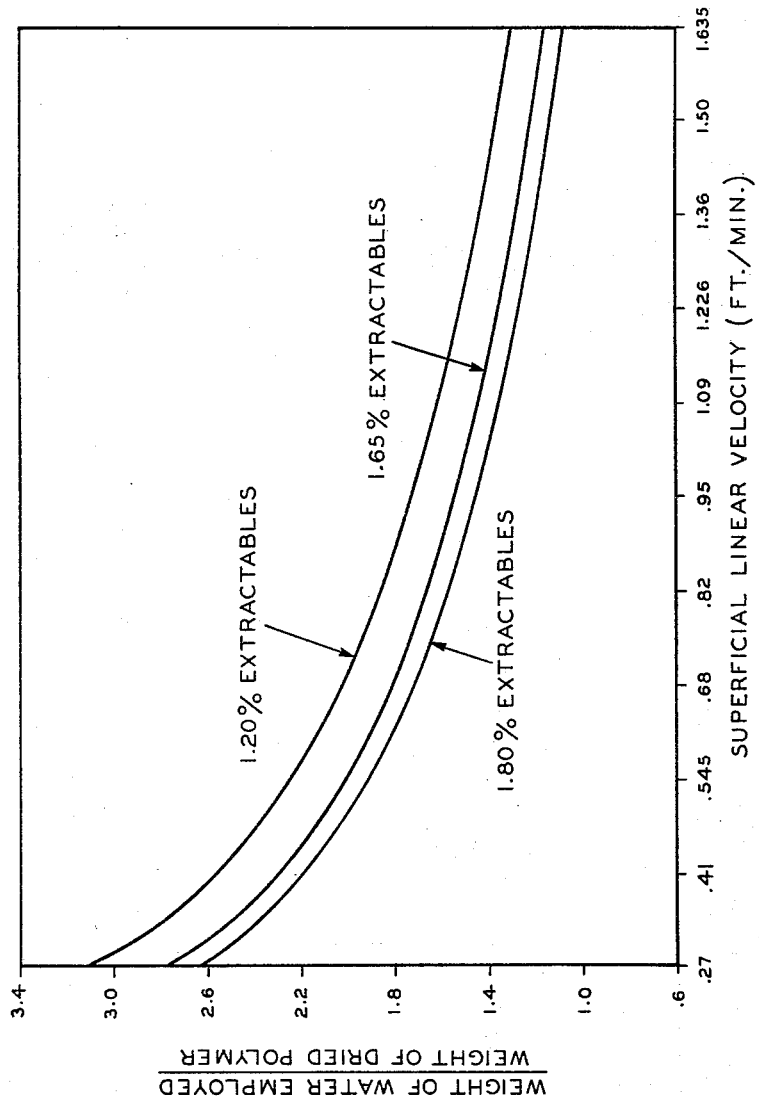

3,373,145
WASHING OF POLYMER PARTICULATES BY REGULAR PERIODIC EBB AND FLOW OF AQUEOUS SOLVENT
John W. Wagner, Petersburg, Va., assignor to Allied Chemical Corporation, New York, N.Y., a corporation of New York
Filed Apr. 29, 1965, Ser. No. 451,886
9 Claims. (Cl. 260—78)

ABSTRACT OF THE DISCLOSURE

This invention reduces the volume of aqueous solvent required for continuous washing of impurities from particles of organic polymer. The aqueous solvent is supplied in countercurrent flow in contact with the particles in an extraction vessel, and an independent ebb and flow of solvent in the extraction vessel is simultaneously created by introducing an increment of solvent into the incoming solvent stream and periodically withdrawing the increment of solvent from the extraction vessel.

---

This invention relates to a process for continuous washing of particulates e.g. particulate polymer by regulated periodic ebb and flow of the water in the column which provides for continuous stage washing.

In processes employed for the continuous washing of particulate polymers specifically polycaproamide polymers, it has been found that at the very low superficial velocities of water flow, typically employed say at .1 feet per minute, as the fresh water condensate slowly moves up the column countercurrent to the flow of the particulate polymer, thermal eddy currents occur which result in a reduced efficiency in the washing of particulate polymers.

If the rate of flow of water is increased to overcome these thermal eddy currents, excessive water consumption per unit time results which adds to the cost of the recovery of the extractables included within these wash-waters.

To decrease the diameter of the wash columns so as to materially affect the superficial linear velocity significantly adds to the required equipment investment, without materially overcoming the problem of the flows and resulting thermal eddy currents. Additionally, the presence of these thermal eddy currents result in non-uniform polymer, in terms of its extractable content, which makes it difficult to control the properties of the final spun and drawn fibers at the desired level of precision, as to those factors influenced by extractable content such as tensile modulus, dye level, and fiber plasticity during the drawing process. These variations prevent attaining the desired uniformity of textile fibers and the ultimate desirable high strength properties of industrial fibers.

Thus a solution of the problem and elimination of thermal eddy currents during the continuous countercurrent washing of particulate polymers is indeed a necessary and important desired technological advancement with respect to economic production of polycaproamide polymers.

An object of this inveniton is to improve methods of continuous countercurrent washing of particulate polymer so that thermal eddy currents are eliminated and the resulting polymer is washed uniformly.

Another object of this invention is to provide for an improved process for the continuous countercurrent washing of particulate polymer so that as the process rates are changed the resulting washed polymer is not altered in its level or uniformity of extractables.

It is still another object of this invention to provide an improved process for the countercurrent washing of particulate polymers whereby the amount of wash water consumed is significantly reduced, thereby effecting economies in the production of said polymers.

The objects and advantages of this invention are accomplished by providing in a process wherein solid particulates are washed and purified from extractables by a countercurrent flow of a solvent of said extractables, an independent ebb and flow of a solvent of said extractables, the superficial linear velocity of the independent flow of said solvent being at least .4 feet per minute, preferably at least .6 feet per minute, to about fluidization point of the particulate mixture under the combined upward flows of solvent, generally for plastic materials about 6.0 feet per minute superficial linear velocity of the combined flows; the amplitude of the independent flow being at least .5 inch as explained below.

It is to be understood that the instant invention is generally applicable to the washing of particulate material with a solvent of the extractables. However, the benefits and advantages of this invention are particularly appreciated in the washing of particulate polymers containing extractables such as nylons e.g. polycarbonamide. In the case of the continuous washing of polycaproamide particulate polymers at a constant temperature of say 100–120° C. and residence time of 8–14 hours, the process parameters are defined by the following equation:

$$\%E \pm .2 = 18.88 - 4.173(W^2 \times V) - \frac{17.567}{(W^2 \times V)}$$

wherein $E$=percent extractables on washed polymers, and $$W = \frac{\text{weight of water employed}}{\text{weight of dried polymer}}$$

and $V$=superficial linear velocity of ebbing or flowing water in feet per minute. In washing particulate polycaproamide polymers according to this invention the extraction of extractables to a suitably low level of extractable content and uniformity in extractable level can be accomplished using less than three parts by volume solvent to one part of polycaproamide particulate polymer.

By the term "superficial linear velocity" is meant the volume of solvent flowed per minute per cross-sectional area of the vessel containing the particulates when empty. In the normal operation of the process a volume of a solvent of the extractables, water in the case of polycaproamide, passes up through the polymer particulates i.e. countercurrent to the gravimetric flow of the polymer at a slow constant rate, so slow that thermal eddy currents would be created; but in the invention, creation of such thermal eddy currents is obviated by superimposing upon the constant flow, the independent flowing and ebbing of a solvent of the extractables, usually the same solvent as that introduced as the constant countercurrent flow. It should be noted that the vessel containing the particulates is provided with a solvent outlet or overflow line above the level of the particulates and near the top of the vessel to take off overflow when the flowing solvent has reached a level at or above the solvent outlet. This occurs normally during the flow phase of an ebb-flow cycle.

The substantially greater purity in the particulates obtained by the process of this invention together with attainment of uniform levels of purity, combined with decrease to say ⅓ the volume of solvent required to reach given purity, are considered a most surprising result.

By the term "fluidization point of the particulate mixture" is meant the point at which the solid particulates begin to flow with the surging solvent. This will happen at various superficial linear velocities of combined constant and independent flow, and depends upon the specific particulate, its density and the solvent employed. Generally, at superficial linear velocities of over 6 feet per minute polycaproamide chips processed to be eventually melt spun into fibers will begin to flow with surging water.

Employment of superficial linear velocities of sufficient magnitude to fluidize the particulates is not recommended as it intermingles particulates from lower in the column with those nearer the feed point, thereby disrupting the progressive purification obtainable by the invention.

We have found unexpectedly that in washing polycaproamide polymer that water consumption per pound of polymer can be decreased from a ratio of 3.0 pounds of water per pound of polymer to 1 pound of water per pound of polymer or less. The saving in water consumption arises by virtue of the fact that less water entering the vessel as the countercurrently flowing solvent need be used when employing the ebb and flow solvent surging process of this invention to obtain the same low level of extractable content in the polymer being withdrawn from the vessel. This saving in water consumption decreases cost. These advantages are accomplished in the case of polycaproamide by flowing water into the vessel from an independent source at superficial linear velocities between about .4 feet per minute and 1.6 feet per minute. At superficial linear velocities above 1.6 feet per minute there is relatively small reduction in the amount of water consumed i.e. the decrease in the level of extractables diminishes only gradually. Additionally, there is a small improvement in the extractable level uniformity as the superficial linear velocity of the water is increased from 1.6 feet per minute to 6.0 feet per minute.

The term "amplitude of the flow" as used herein refers to the height of the wave caused by the introduction of the solvent at the given superficial linear velocities into the vessel from a separate source. This amplitude is dependent upon the volume of solvent introduced as well as the cross sectional area or diameter of the vessel. It is important that the amplitude of the flow or the height of the wave be at least .5 inch. Use of an ebb and flow phase employing less than a .5 inch amplitude of flow does not generally afford the desired uniform level in extractable content. On the other hand, one can utilize the process of this invention employing a substantially higher amplitude of flow say 4 inches or higher at the given superficial linear velocities and obtain good extraction with uniformity in the amount of extractables present in the withdrawn polymer.

In normal operations using a vessel having a height to diameter ratio of at least 5:1 with a diameter of at least 3.5 feet the amplitude of flow will be regulated by the ebb and flow frequency although this invention is applicable to extraction in vessels having less than a height to diameter ratio of 5:1. However, such a minimum ratio of vessel dimension is desirable. By the term "ebb and flow frequency" is meant the number of times a complete ebb and flow cycle is performed per unit time. A complete ebb and flow cycle is performed when all of the solvent has flowed and an amount of solvent of substantially the same volume has been removed from contact with the particulate. Employing a vessel having height to diameter ratio of 5:1 and at least 3.5 feet diameter the amplitude of flow can generally be regulated utilizing an ebb and flow frequency ranging from about .2 to about 30 cycles per minute. When the diameter of the tank is less than 3.5 feet per minute an increase in the maximum number of ebb and flow cycles to 40 at the above superficial linear velocities is made to adjust for the smaller diameters. The adjustment of ebb and flow frequency to within the stated ranges is merely a handy method by which those skilled in the art can adjust the amplitude of the flow to at least a value of 0.5 inch for a given vessel. It should be noted that by adjusting the ebb and flow frequency for a given superficial linear velocity the volume of solvent introduced in the flow phase of the cycle is adjusted. If the ebb and flow frequency is increased with constant superficial linear velocity and amplitude, the volume of solvent introduced is decreased. Hence, if a relatively high volume of solvent is employed you can decrease the ebb and flow frequency for a given vessel but only so much as not to change the superficial linear velocity outside the stated range.

The particulate polymers treatable include polyethylene terephthalate, polypropylene and polyamides in addition to polycaproamide such as polyhexamethylene-adipamide, nylon 7, nylon 8 and nylon 12 and copolymers thereof. These polymers are often purified by extraction with aqueous solutions of acids or bases. The particulate polymers above especially polycaproamide are normally produced by transversely cutting rods or strands of polymer into pellets. In still another method, sheets of the polymer are diced to form flakes, squares or rectangles. Normally the diameter of the rods is between .05 and .25 inch. The rectangles or squares are maintained within this same range of .05 inch at their smallest dimension with cubes at a maximum dimension of .25 inch. If a smaller pellet size is employed, too great a surface area of the polymer is exposed to oxidative and surface degradation. If a too large particle is used (greater than .25 inch) the rates of diffusion and washing rates are unnecessarily prolonged.

In extracting polycaproamide polymers it has been found that there is a rapid increase in the rate of extraction from 90–110° C. and from 110–120° C., there is a relatively small change in the rate of extraction.

The very significant effect of superficial linear velocity upon the extraction rate of polymers of this invention can be observed in the following Table I.

TABLE I

| Weight of Water Employed/Weight of Dried Polymer Produced | Superficial Linear Velocity of Flow (ft./min.) | Extractable Content in Washed Polymer (wt. percent) | Range in Extractable Content in Washed Polymer |
|---|---|---|---|
| 3.93 | .21 | 1.24 | ±.4 |
| 2.30 | .41 | 1.67 | ±.3 |
| 1.62 | .90 | 1.62 | ±.1 |
| 1.16 | 1.63 | 1.60 | ±.1 |

In the experiments for Table I above, the volume of water introduced as the flow was varied from 76 to 205 gallons. From the data therein it is observed that the major factor for the control of extractable content and the reduction in the amount of water employed or consumed per pound of dried polymer produced is the superficial linear velocity of the water past the polymer particles in the vessel. Alteration of the ebb-flow frequency as long as the average superficial velocity does not change and the amplitude of the flow is at least .5 inch preferably 4 inches causes little change in the amount of water consumed for a given extractable level.

In order to more fully illustrate the nature of the invention and the manner of practicing the same, reference is had to the accompanying drawings in which:

FIGURE 2 is a graph showing three curves for different extractable content levels in polycaproamide. The graph plots $$\frac{\text{weight of water employed}}{\text{weight of dried polymer}}$$

Figure 1:
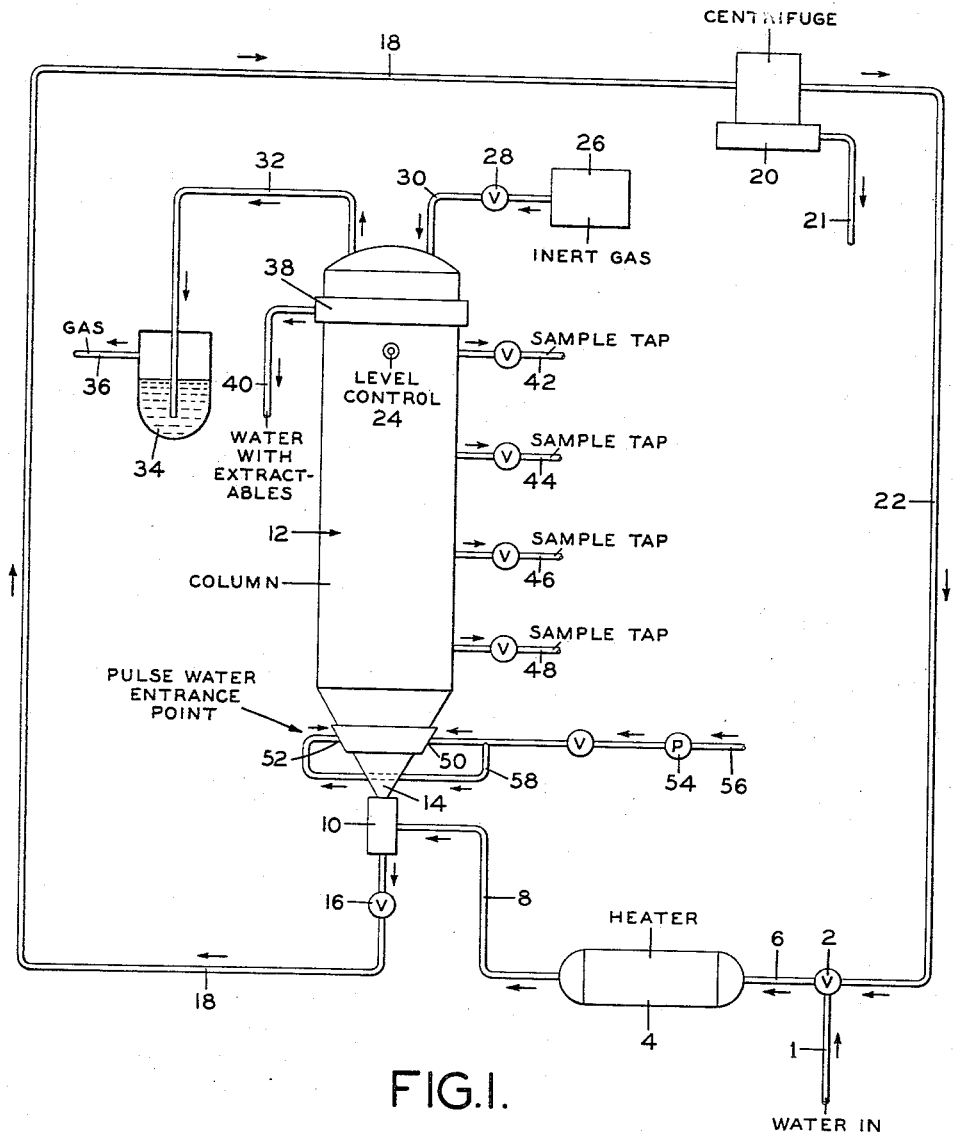
FIGURE 1 is a schematic diagram showing a manner of commercially practicing this invention.

against the superficial linear velocity in feet per minute caused by the flow phase of an ebb-flow cycle.

Referring to FIGURE 1, fresh demineralized and deionized make-up water which eventually constitutes a counter-current flow is introduced through line 1 valve 2 and proceeds to heater 4 via line 6. The water is heated in heater 4 to temperature say in the range of 95–120° C. and passes out of heater 4 through line 8 to flush chamber 10. The newly introduced water in flush chamber 10 advances countercurrent the flow of polymer pellets being washed in extraction column 12. This water displaces water previously introduced forcing said water upwards through cone 14. Polymer pellets being withdrawn from extraction column 12 via cone 14, flush chamber 10 and rotary discharge valve 16 are actually commingled with fresh demineralized, deionized water just introduced through line 8 into flush chamber 10. The mixture of washed polymer pellets and water is sent through line 18 to centrifuge 20 where the polymer pellets are separated and the water is recycled as wash liquid through line 22 joining line 6 at the point of introduction of fresh water at valve 2. Polymer passes from centrifuge 20 through line 21 to further processing. Not all of the water passing into flush chamber 10 passes out through discharge valve 16. The balance passes up through cone 14 into extraction column 12 at a slow rate. The extraction column is filled with pellets to a level up to or below level control 24. This adjusts the level of the pellets in the extraction column by a radiation actuated sensing device which regulates the rate of discharge of polymer solids. The countercurrently flowing water passes up the extraction column 12 at such a slow rate that thermal eddy currents are created. Inert gas from a source 26 can optionally be introduced to keep a slight pressure over the washing operation and to purge the system of some oxygen. This gas, suitably $N_2$—$CO_2$ mixture, passes into extraction column 12 through valve 28 via line 30. It passes out of extraction column 12 via line 32 and into a solvent of the extractables and non-solvent of the gas maintained in vessel 34. The gas passes out gas outlet line 36. The extraction column is fitted with a plenum chamber 38 into which overflow within extraction column 12 passes and thence out line 40 for further processing of extractables e.g. depolymerization. Extraction column 12 has also fitted to it sample taps 42, 44, 46, 48 which enable the operators of the washing procedure to withdraw samples and determine the level of extractables in the extraction column at a given height in the column.

Cone 14 has fitted thereto preferably at least two entrance ports 50 and 52 for introduction of surging waters during the flow or "on" portion of the ebb and flow cycle and for withdrawal of water during the ebb or "off" portion of the cycle. The flow can be provided by pump 54 or a cylinder having a small opening at the bottom and fitted with a piston operable by any convenient piston operating mechanism. The pump feeds water through line 56 and bypass 58. In the case of a cylinder and piston the opening in the bottom of the cylinder has fitted thereto line 56 through which water originating in the cylinder chamber is passed.

In operation utilizing a pump, the water is forced into the extraction column 12 via lines 56 and 58 and entrance ports 50 and 52 immediately causing a corresponding rise in the level of water at the top of the tank to the point of overflow at plenum chamber 38; and/or increases the overflow. This overflow point is above the level of the bed of polymer pellets being washed which level is maintained constant by level control 24 embodying a radiation-actuate sensing device regulating the discharge of solids through rotary discharge valve 16. If the overflow outlet is small, the water level will rise above the outlet during the flow or "on" phase of the ebb-flow cycle. When the pump is shut off for the ebb or "off" phase of the cycle, the water level at the top of the extraction column drops corresponding to drainage of the water from the extraction column back into the tank. The volume of water supplied to and drained from the extraction column is set by level controls (not shown) in the storage tank (not shown), one of which turns the pump on when the water rises in the storage tank to a pre-set level; and another which turns the pump off and opens the drainage valve when the water in the storage tank falls to a pre-set level.

It is to be understood that it is not deleterious if overflow from the top of the extraction column 12 is maintained continuously by use of a relatively small outlet discharging only at the rate of feed of incoming fresh wash water and giving a head of water above the outlet during the flow of "on" portion of the cycle. In some operations it may be preferred to conduct the process so that the water level in the extraction column rises to the overflow point only during the "on" or flow phase and the overflow stops during at least part of the "off" phase. Such an operation utilizes a large outlet. Of course the rate of overflow will adjust itself so that, during the "on" or flow phase, the overflow will remove just the increment of water due to the continuous feed of incoming water including that accumulated during the "off" or "ebb" phase when no overflow is occurring.

In the extraction of continuous countercurrent washing of poly-e-caproamide, the major process factors are temperature of the water employed, residence time in the extraction column, and water to polymer ratio. This relationship can be expressed as $$\log E = -1.60 + (222/T \,^\circ C.) - 0.16 \log (RW)$$

where $E$=residual percent extractables in the polymer after leaching, $T$=the water temperature in degrees centigrade, $R$=the residence time in the column in hours and $W$=the weight ratio of water employed or consumed to polymer obtained on a dry basis. It has been found that the equation above correctly describes the optimum process limits to achieve a given extractable level within the range of ±.2% extractables. This equation is representative within the limits of a temperature of 93–105° C. and within the residence time of 3 to 20 hours.

In order to more fully illustrate the nature of this invention and the manner of presenting the same, the following example is presented.

*Example 1*

Referring to FIGURE 1, polycaproamide polymer of discrete pellet size and having cross-sectional dimensions of .10 inch by .10 inch is flowed continuously into the extraction column 12 from a source not shown at rates between 2000 and 6000 pounds per hour. The extraction column employed was 5 ft. in diameter and approximately 63 ft. tall including a 4 ft. 8″ cone at the base. Sample taps as shown in the figure were provided at 4 equal distance points along the height of the column. The water flow counter-current to the flow of the polycaproamide pellet was maintained at a series of constant rates from 7 to 35 gallons per minute, coordinated with the polymer feed rate and the desired superficial linear velocity of the independent flow from a separate source of water. The polymer residence time in the extraction column was maintained between 6 and 8 hours. The condensate water entering the extraction column and water introduced from a separate source causing the ebb and flow at a high superficial linear velocity was varied at temperatures of 105–110° C. or 120° C. Ebb and flow cycles caused by the introduction of water from another source at high superficial linear velocities were maintained, the cycles varying between 40 and 240 seconds (fill and empty). This superficial linear velocity of water was maintained using a pump in association with a vessel containing the water as described above. The volume of water introduced through the pump varied between 76 gallons and 205 gallons while the number of ebb and flow cycles was maintained between 0 and 3 per minute. During each flow or "on" phase of the ebb and flow cycle water surged upwards at a constant volume of velocity, and the water was taken off at the overflow line near the top of the column. The results of the runs are shown in Table 2 below from which it can be seen that:

(1) The weight ratio of water employed to poly-e-caproamide pellets obtained from the extraction column required significantly decreases with increased superficial linear velocity of flow past the pellets' surface. Correspondingly, the extractable content for a given weight of aqueous extraction medium employed significantly decreases with increased superficial linear velocity past the pellets' surface.

(2) The significant factor in the operation of the process is the superficial linear velocity rather than the frequency of the ebb and flow and cycles maintained or the volume of solvent introduced during a cycle. of the wave caused by the introduction of the increment of solvent being at least .5 inch.

TABLE II

| Run Number | Ratio of Weight of Water Employed/ Weight of Polycaproamide | Superficial Linear Velocity, ft. per min. | Polymer Extractables/Percent Range | Polymer Feed Rate, lbs. per hr. | Counter-Current Fresh Water Flow, lbs. per hr. | Calculated Water/Poly-caproamide Ratio |
|---|---|---|---|---|---|---|
| 1 | 3.93 | .21 | 1.24±.4 | 2,475 | 8,879 | --- |
| 2 | 2.30 | .41 | 1.67±.3 | 2,210 | 4,830 | 2.34 |
| 3 | 2.20 | .37 | 1.79±.3 | 3,407 | 7,700 | 2.4 |
| 4 | 1.86 | .70 | 1.65±.2 | 3,595 | 6,660 | 1.8 |
| 5 | 1.67 | .80 | 1.70±.2 | 3,393 | 5,673 | 1.68 |
| 6 | 1.62 | .90 | 1.62±.15 | 2,930 | 3,946 | 1.60 |
| 7 | [1]3.1 | .27 | 1.21±.3 | 3,080 | 9,500 | 3.1 |
| 8 | 1.96 | .84 | 1.13±.1 | 3,393 | 6,660 | 1.92 |
| 9 | [2]1.30 | 1.635 | 1.22±.1 | 3,450 | 4,500 | 1.32 |
| 10 | [2]1.16 | 1.63 | 1.60±.16 | 6,100 | 7,350 | 1.62 |
| 11 | 1.52 | .915 | 1.61±.15 | 2,441 | 3,674 | 1.6 |
| 12 | 1.66 | .89 | 1.66±.15 | 2,974 | 4,933 | 1.6 |

| Run Number | Extractable Content Solvent 2nd Tap, Percent | Temperature of Water at Inlet, °C. | Duration of Ebb-Flow Cycle in Seconds | | Ebb-Flow Volume | | | |
|---|---|---|---|---|---|---|---|---|
| | | | Fill | Empty | Volume, gallons | Fill, gallons per min. | Empty, gallons per min. | Average, gallons per min. |
| 1 | | 108 | | | | | | |
| 2 | 1.3 | 107 | 105 | 105 | 100 | 57 | 57 | 57 |
| 3 | 2.5 | 120 | 90 | 90 | 80 | 54 | 54 | 54 |
| 4 | 1.8 | 120 | 120 | 120 | 205 | 103 | 103 | 103 |
| 5 | 2.0 | 120 | 60 | 60 | 117 | 117 | 117 | 117 |
| 6 | 2.3 | 120 | 45 | 75 | 122 | 163 | 97.5 | 130 |
| 7 | | 120 | 120 | 120 | 80 | 40 | 40 | 40 |
| 8 | | 120 | 90 | 90 | 185 | 123 | 123 | 123 |
| 9 | | 120 | 30 | 30 | 120 | 240 | 240 | 240 |
| 10 | | 120 | 30 | 30 | 120 | 240 | 240 | 240 |
| 11 | 2.6 | 120 | 43 | 83 | 122 | 170 | 97.5 | 133 |
| 12 | 2.3 | 120 | 43 | 83 | 122 | 170 | 88.5 | 129.5 |

[1] Control prior art, no pulse employed.
[2] Extrapolated data.

It is readily seen from the foregoing that I have provided a significant advance in the extraction of impurities from solid particulates with solvents of the extractables and non-solvents of the particulates. More particularly, I have provided a significant advance in the washing of polyamide polymers especially polycaproamide with water to achieve low extractable content in the polyamide together with a high level of uniformity of this extractable content. Other advantages of my invention are apparent to those skilled in the art.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:
1. A process for washing particulates to obtain purified organic polymeric particulates having a smallest dimension in the range between 0.05 inch and 0.25 inch purified from water soluble extractables which comprises passing an aqueous solvent for the extractables and non-solvent for the particulates counter-current to the flow of particulates maintained within an extraction vessel and independent from said counter-current solvent flow, ebbing and flowing an increment of solvent for said extractables and non-solvent for said particulates within said vessel, the superficial linear velocity i.e. the volume of solvent flow per minute per cross-sectional area of the empty extraction vessel of the independent incremental flow being between .4 feet per minute and the fluidization point of the solvent-particulate mixture i.e. the velocity of solvent flow at which the solid particulates begin to flow with the surging solvent; the amplitude of the flow i.e. the height of the wave caused by the introduction of the increment of solvent being at least .5 inch.

2. A process according to claim 1 wherein said superficial linear velocity is between about .6 feet per minute and 6.0 feet per minute.

3. A process according to claim 1 wherein said vessel has a height to diameter ratio of at least 5:1.

4. A process according to claim 1 wherein said particulates are polyamide polymer pellets containing extractables.

5. A process according to claim 1 wherein the solvents are water.

6. A process according to claim 5 wherein said water is at a temperature of between about 90 and 120° C.

7. A process according to claim 3 wherein said vessel has at least a 3.5 ft. diameter and the ebb and flow frequency ranges from about .2 to about 30 cycles per minute.

8. A process according to claim 1 wherein said particulates are poly-e-caproamide pellets, said solvent is water, said vessel has a height to diameter ratio of at least 5:1 and a diameter of at least 3.5 feet and the superficial linear velocity is between .6 and 6.0 feet per minute.

9. A process according to claim 8 wherein the amplitude of the flow is at least 4.0 inches.

References Cited

UNITED STATES PATENTS

| 2,978,439 | 4/1961 | Kersting | 260—78 |
| 3,015,651 | 1/1962 | Kjellmark | 260—78 |
| 3,047,565 | 7/1962 | Braun et al. | 260—78 |
| 3,149,095 | 7/1964 | Cerutti | 260—78 |
| 3,245,964 | 4/1966 | Weisner et al. | 260—78 |

WILLIAM H. SHORT, Primary Examiner.

H. D. ANDERSON, Assistant Examiner.